May 1, 1934. W. C. FURNAS Re. 19,150

MAGNETIC CLUTCH

Original Filed March 5, 1928 3 Sheets-Sheet 1

INVENTOR
W. C. FURNAS
BY Munn & Co.
ATTORNEYS

May 1, 1934. W. C. FURNAS Re. 19,150

MAGNETIC CLUTCH

Original Filed March 5, 1928 3 Sheets-Sheet 2

INVENTOR
W. C. FURNAS
BY Munn & Co.
ATTORNEYS

May 1, 1934. W. C. FURNAS Re. 19,150
MAGNETIC CLUTCH
Original Filed March 5, 1928 3 Sheets-Sheet 3
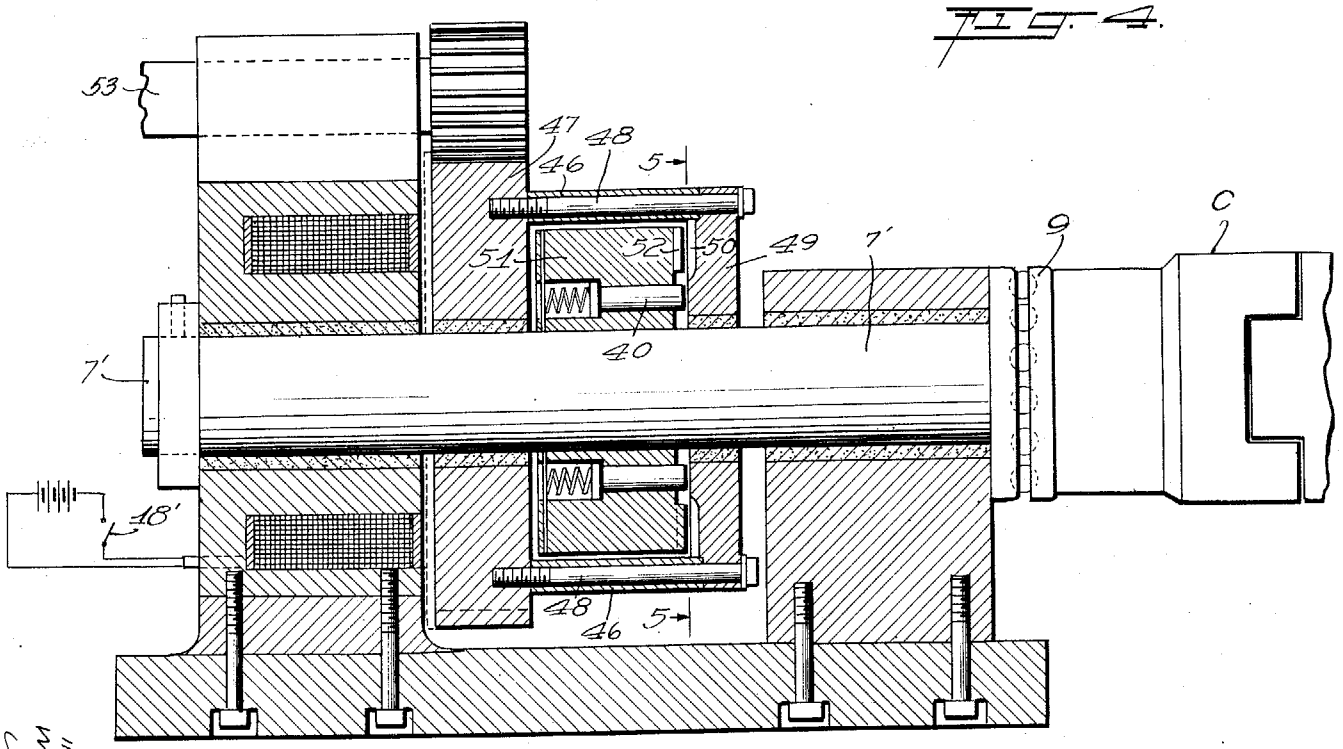
INVENTOR
W. C. FURNAS
BY Munn & Co.
ATTORNEYS Reissued May 1, 1934

Re. 19,150

UNITED STATES PATENT OFFICE 19,150

MAGNETIC CLUTCH

William C. Furnas, West Allis, Wis.

Original No. 1,826,929, dated October 13, 1931, Serial No. 259,353, March 5, 1928. Application for reissue November 13, 1931, Serial No. 574,889

40 Claims. (Cl. 192—84)

My invention relates to improvements in magnetic clutches, and it consists in the combinations, constructions, and arrangements herein described and claimed.

An object of my invention is to provide a magnetic clutch in which there are no rotating electrical parts, thereby dispensing with collector rings, brushes, and the like.

A further object is to provide a magnetic clutch in which there are no exposed electrical parts, thereby providing a device which may be operated under water, oil, or the like.

A further object is to provide a magnetic clutch which is safe in that the electrical parts are sealed up, and a device which is durable in that there are relatively few parts.

Other objects and advantages will appear in the following specification, and the novel features of the invention will be particularly pointed out in the appended claims.

Figure 1:
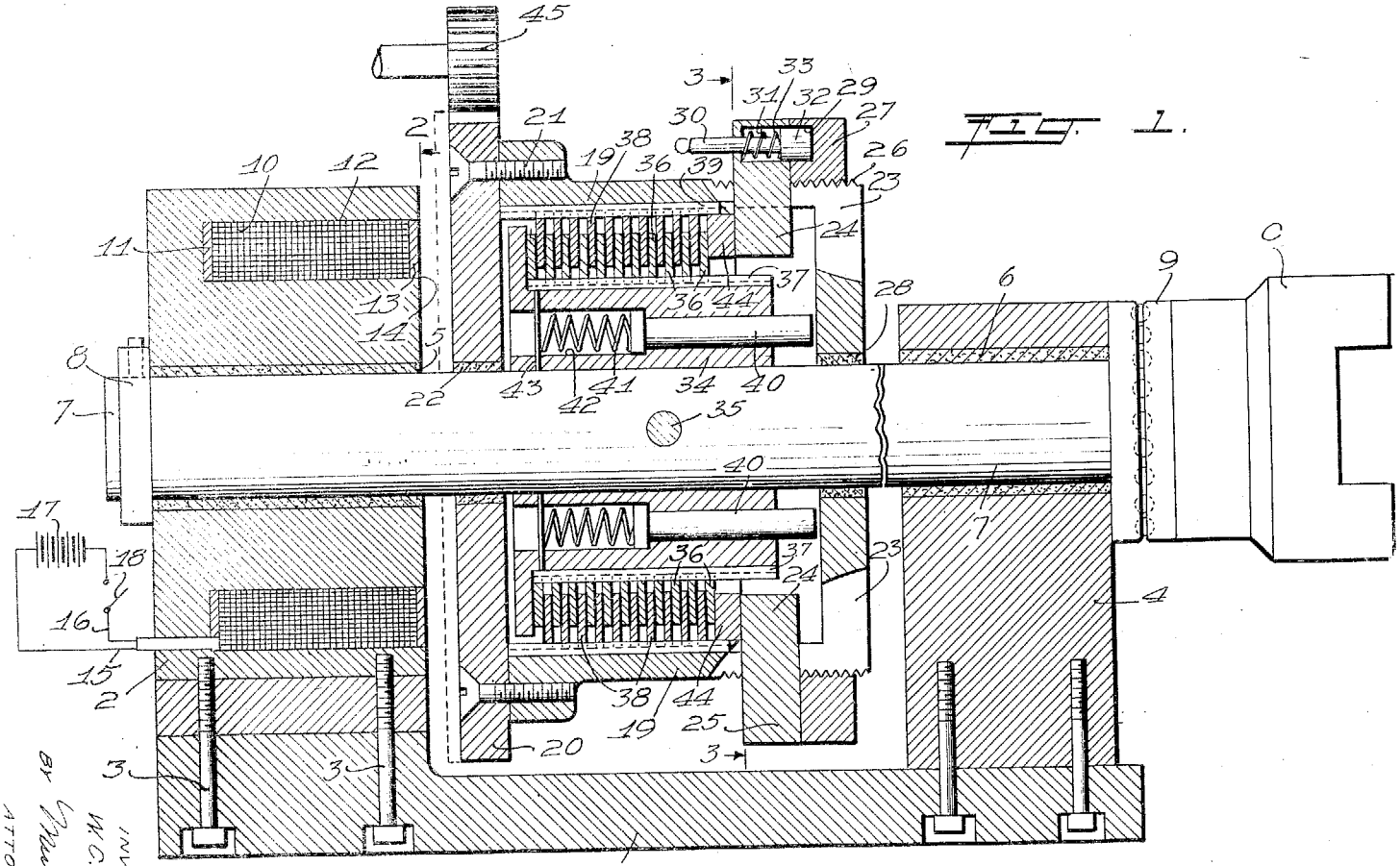
Figure 2:
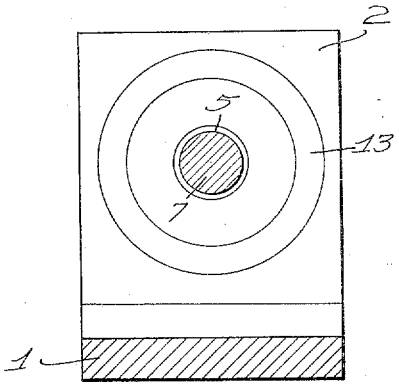
Figure 3:
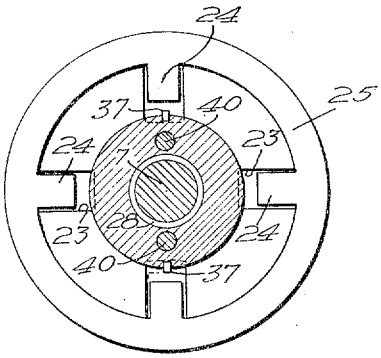
Figure 5:
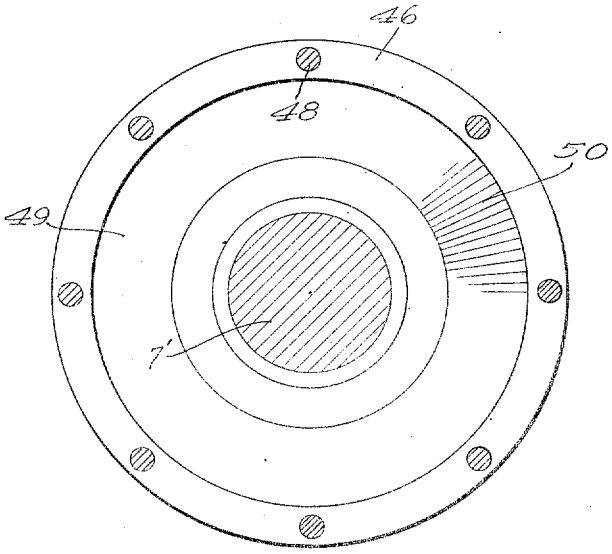

Several embodiments of my invention are illustrated in the accompanying drawings, forming part of this application, in which Figure 1 is a longitudinal sectional view of one form of my device, Figure 2 is a sectional view taken along the line 2—2 of Figure 1, Figure 3 is a sectional view taken along the line 3—3 of Figure 1, Figure 4 is a longitudinal sectional view of a modified form of my device, and Figure 5 is a detail view taken along the line 5—5 of Figure 4.

In carrying out one embodiment of my invention, I make use of a base 1 upon which a frame 2 is secured by means of bolts 3. A pillow block 4 is also secured to the base, as shown in Figure 1. The frame 2 and the pillow block 4 are provided with bearings 5 and 6, respectively. These bearings are disposed in axial alignment. A shaft 7 is disposed within the bearings and is supported against longitudinal movement by the provision of a collar 8 disposed adjacent the frame 2 and a thrust bearing 9 disposed adjacent the pillow block 4.

The frame 2 is provided with an annular recess 10. Referring to Figure 1, I have shown a collar 11 disposed within the recess and a coil 12 disposed adjacent the collar 11 and occupying substantially the entire space within the recess. A closure collar 13 is disposed within the recess and secured therein by clinching the edges 14 of the recess 10. Conductors 15 and 16 connect the coil 12 with a source of current, such as a battery 17. The current supply to the coil 12 may be cut off by actuating a switch 18, as shown in Figure 1.

A clutch pot 19 is mounted for rotation upon the shaft 7. A member 20, here shown as provided with teeth to form a gear, is secured to the clutch pot 19 by means of suitable screws 21. The gear 20 is provided with a bearing 22 through which the shaft 7 is passed. The clutch pot 19 is provided with a plurality of slots 23 through which lugs 24 integral with a pressure ring 25 are passed. The clutch pot is threaded at 26 to receive a retaining nut or ring 27 which is threaded and disposed upon the threaded portion 26 of the clutch pot. The closed end of the clutch pot 19 is provided with a bearing 28. A plurality of openings 29 is provided in the nut 27. A locking pin 30 is supported within an opening 31 in the pressure ring 25. The locking pin 30 is provided with a head portion 32 which is moved into one of the openings 29 by reason of a spring 33 when the nut 27 is moved so as to bring one of the openings 29 into longitudinal alignment with the opening 31.

Referring to Figure 1, I have shown a clutch spider 34 disposed within the clutch pot 19 and firmly secured in the shaft 7 by means of a suitable pin 35. A plurality of bronze rings 36 is movably mounted upon the spider 34 by means of keys 37. The keys 37 prevent rotary movement of the rings 36 with respect to the spider 34, but permit longitudinal movement. The rings are spaced apart and a plurality of steel rings 38 is alternately disposed between the bronze rings 36 in the manner shown in Figure 1. The rings 38 are keyed within the clutch pot 19 by means of suitable keys 39. The rings 38 are keyed against rotary movement but are permitted to move longitudinally with respect to the longitudinal axis of the shaft 7 in the same manner as are the rings 36.

The clutch spider 34 carries releasing pins 40 which are normally disposed in the positions shown in Figure 1 by reason of the springs 41. The springs 41 are retained within openings 42 in the spider by means of pins 43. The outer ends of the pins 40 are disposed almost but not quite in engagement with the closed end of the clutch pot 19 when the magnet 2 is deenergized. The amount of clearance or lost motion between the end of the clutch pot 19 and the pins 40 may be adjusted as hereinafter pointed out. A ring 44 is disposed within the clutch pot 19 and between the lugs 24 and the rings 36 and 38. This ring is keyed against rotation by means of the keys 39 and may be moved inwardly in the direction of the rings 36 and 38 for binding the latter together when the pressure ring 25 is moved, as will be more fully explained later.

The clutch pot 19, or its equivalent, may be driven in any suitable manner by any suitable means. In the embodiment shown the pot 19 is driven by a gear or pinion 45 meshing with teeth here indicated as formed on one end of the pot, in this instance on the member 20.

From the foregoing description of the various parts of the device, the operation thereof may be readily understood. Referring to Figure 1, it will be seen that the gear 20, the clutch pot 19, and the pressure ring 25 rotate about the longitudinal axis of the shaft 7 and independently thereof when in the full line position. At this time, the rings 38 are free to rotate independently of the rings 36. Let us assume now that the switch 18 is closed for the purpose of energizing the coil 12. When the coil 12 is energized, the frame 2 may be said to be converted into a magnet for attracting the gear 20 and the clutch pot 19. In other words, the gear 20 may be said to function as an armature. Movement of the armature 20 in the direction of the frame 2 will of course result in a relative movement of the clutch pot 19. Movement of the clutch pot 19 causes the pressure ring 25, that is to say, the lugs 24 to be moved inwardly against the ring 44, thereby operating to bind the rings 36 and 38 together, the latter are bound between the ring 44 and the flange portion of the spider 34. At this time, the armature has moved the clutch pot 19 so that the armature is disposed substantially in the dotted line position and is held in this position during the time that the switch 18 is closed.

When the clutch pot 19 is moved for bringing the rings 36 and 38 into frictional engagement, the pins 40 are depressed against the tension of the springs 41. When the current has been cut off from the coil 12 by opening the switch 18, the armature 20 and the clutch pot 19 will return to the full line position by reason of the pins 40 which are moved against the closed end of the clutch pot by reason of the springs 41. It will thus be seen that the pins 40 move the clutch pot 19 so that the rings 38 are freed from frictional engagement with respect to the rings 36.

The locking pin 30 permits adjustment of the pot 19 with respect to the pressure ring 25, and consequently, adjustment of the armature 20 with respect to the magnet 2 and also adjustment of the end of the pot with respect to the pins 40. Thus clearance may be secured and maintained between the end of the pot 19 and the pins 40, or the relationship between the armature 20 and magnet 2 adjusted, to compensate for wear of the clutch surfaces proper, or for any other reason. When making this adjustment, the pin 30 is pulled outwardly for removing the portion 32 from the opening 29 in the nut 27. The nut may then be rotated for adjustment and again made secure by releasing the pin 30, whereupon the portion 32 will pass into one of the openings 29.

It will be noted that when the switch 18 is closed for energizing the coil, the movement of the armature 20 and the clutch pot 19 will result in a force being exerted upon the shaft 7 in the direction of the frame 2 and parallel to the longitudinal axis of the shaft. The function of the thrust bearing 9 is to prevent longitudinal movement of the shaft 7.

In Figures 4 and 5, I have shown a modified form of my device. In this form of the device, the clutch pot consists of a ring 46 secured to an armature 47 by means of bolts 48. As in the case of Figure 1 the armature 47 may serve as a gear, in engagement with the pot 46. A clutch plate 49 having teeth 50 in one face thereof is secured to the ring 46 by the bolts 48. A clutch ring 51 is secured to the shaft 7'. The clutch ring 51 is provided with teeth 52 for engaging the teeth 50. The operation of my modified form is similar to that of the form shown in Figure 1, in that when the switch 18' is closed, the armature 47, together with the ring 46 and the clutch plate 49, is moved in the direction of the clutch ring 51 for bringing the teeth 50 into engagement with the teeth 52. Engagement of these teeth will of course lock the rotating armature 47 and the clutch plate 49 with respect to the clutch ring 51, thereby transmitting rotary motion from a shaft 53 to the shaft 7'. This form of the device is also provided with pins 40 for moving the movable element away from the clutch ring 51 which is secured to the shaft 7' when the switch 18' is opened. In both forms of the device, a coupling C is secured to the shafts 7 and 7'. The thrust bearing 9 is disposed between the coupling C and the pillow block 4.

It will be understood that power may be applied to the shaft 7 directly, and the gear 45 and the shaft to which it is secured operated through the medium of the clutch mechanism in the usual manner.

I claim:

1. In combination: driving means; driven means; clutch means for operatively connecting said driving and driven means; a winding; a magnetic circuit for said winding consisting of a normally stationary portion and an armature, disposed between said stationary portion and said clutch means, and means whereby movement of said armature toward said stationary portion causes engagement of said clutch means.

2. In combination: driving and driven means, one of said means including a rotatable shaft; clutch means for operatively connecting said driving and driven means; a magnet; a disc armature for said magnet rotatable about said shaft as a bearing and axially movable on said shaft, and disposed between said clutch means and said magnet; and means for operatively connecting said armature to said clutch means.

3. In combination: a rotatable shaft; a clutch element rotatable with and movable axially of said shaft; another clutch element movable axially of said shaft and normally out of engagement with said first named element; operating means for causing engagement of said clutch elements, disposed at one axial side of said elements; actuating means for said operating means disposed at the other axial side of said elements; and a cylinder surrounding said clutch elements and connecting said actuating means and operating means.

4. In combination: a rotatable shaft; a clutch element rotatable with and movable axially of said shaft; another clutch element movable axially of said shaft and normally out of engagement with said first named element; operating means for causing engagement of said clutch elements, disposed at one axial side of said elements; and actuating means for said operating means disposed at the other axial side of said elements.

5. In combination: a rotatable shaft; a plurality of friction discs rotatable with said shaft; a housing disposed around said discs; a plurality of friction discs rotatable with said housing and alternating with said first named discs; operating means disposed at one axial side of and for causing engagement of said two pluralities of discs; and actuating means for said operating means disposed at the other axial side of said two pluralities of discs.

6. In combination: driving means; driven means; clutch means for operatively connecting said driving and driven means, said clutch means having elements spaced to provide a predetermined amount of free play; a magnet; an armature for said magnet; means for operatively connecting said armature to said clutch means; and means for adjusting the spacing of said clutch elements and the position which said armature assumes relatively to said magnet when said magnet is de-energized.

7. In combination: driving means; driven means; clutch means for operatively connecting said driving and driven means; means for operating said clutch means to connecting position; means for biasing said clutch means out of connecting position; and a lost motion connection between said operating means and said biasing means.

8. In combination: driving means; driven means; clutch means for operatively connecting said driving and driven means; means for operating said clutch means to connecting position; means for biasing said clutch means out of connecting position; a lost motion connection between said operating means and said biasing means; and means for adjusting the amount of said lost motion.

9. In combination: driving and driven means, one of said means including a rotatable shaft; clutch means for operatively connecting said driving and driven means; a magnet; a disc armature for said magnet, rotatable about said shaft and disposed between said magnet and said clutch means; operating means for said clutch mechanism disposed at the side of said clutch mechanism opposite from said armature; and means for operatively connecting said armature to said clutch operating means.

10. In combination: a rotatable shaft; clutch mechanism including a portion freely rotatable about and movable axially of said shaft, and another portion rotatable with said shaft; means for moving said first named portion axially of said shaft into effective engagement with said second named portion; means for biasing said portions out of engagement; and means including a single thrust bearing for said shaft for taking the thrust of said operating means and the reaction of said biasing means.

11. A magnetic clutch comprising a frame provided with an electric coil, a shaft, a gear disposed upon said shaft and disposed in close proximity to said frame to thereby serve as a disc armature for said coil and frame, a clutch mechanism disposed upon said shaft and upon that side of the gear opposite said frame, and means connected with said gear for operating said clutch mechanism.

12. A magnetic clutch comprising a frame provided with an electric coil, a shaft, a gear disposed upon said shaft and disposed in close proximity to said frame to thereby serve as a disc armature for said coil and frame, a clutch mechanism disposed upon said shaft and upon that side of the gear opposite said frame, and means connected with said gear for operating said clutch mechanism.

13. A magnetic clutch comprising a frame provided with an electric coil having one edge terminating substantially flush with one side of the frame, a shaft, a gear mounted for rotation upon said shaft as a bearing and disposed in close proximity to said frame to thereby serve as an armature for said coil and frame, said gear being arranged to be moved longitudinally upon said shaft, a clutch mechanism having a portion secured to said shaft and the other portion secured to said gear and movable therewith, said last-named portion being arranged to be moved into operative engagement with said first-named portion when the gear is moved in the direction of the energized coil.

14. A magnetic clutch comprising a normally stationary frame provided with an electric coil having one edge terminating substantially flush with one side of the frame, a shaft, a gear mounted for rotation upon said shaft and disposed parallel to and in close proximity to said side of said frame, said gear being arranged to be moved longitudinally upon said shaft, and a clutch mechanism having a portion secured to said shaft and the other portion secured to said gear and movable therewith, said last-named portion being arranged to be moved into operative engagement with said first-named portion when the gear is moved in the direction of the energized coil, said first-named portion being provided with means for disengaging said portions when the coil is de-energized.

15. A magnetic clutch comprising a frame provided with an energizable coil, a normally stationary shaft, a clutch mechanism mounted upon said shaft and having a portion secured thereto and a second portion loosely mounted thereon, a gear connected with said second portion and positioned relatively near one face of said frame to thereby serve as an armature for said coil and frame, said second portion being movable together with said gear when the coil is energized for frictionally locking the two clutch portions together, and means carried by the second portion for adjusting the relationship between the first and second named portions.

16 In combination: a rotatable shaft; a clutch mechanism mounted on said shaft and having a portion secured thereto and a second portion loosely mounted thereon; a magnet; an armature for said magnet; connected with said second portion, said second portion being movable together with said armature when said magnet is energized for bringing said clutch portions into effective engagement; and means carried by said second portion for adjusting the relationship between said first and second portions.

17. In combination: a rotatable shaft; a clutch pot rotatably mounted on said shaft; a magnet; an armature for said magnet rotatably mounted on said shaft; said armature being connected to said clutch pot and defining one end thereof; a clutch element disposed within said clutch pot and connected with said shaft; a companion clutch element connected with said clutch pot and movable into effective engagement with said first named element; and means carried by said clutch pot for adjusting the relationship between said pot and said clutch elements.

18. In combination: a rotatable shaft; a clutch pot rotatably mounted on said shaft; a magnet; an armature for said magnet rotatably mounted on said shaft; said armature being connected to said clutch pot and defining one end thereof; a clutch element disposed within said clutch pot and connected with said shaft; a companion clutch element connected with said clutch pot and movable into effective engagement with said first named element; means carried by said clutch pot for adjusting the relationship between said pot and said clutch elements; and means for moving said clutch elements out of effective engagement when said magnet is de-energized.

19. A magnetic clutch comprising a frame provided with an energizable coil, a normally stationary shaft, a clutch unit fixed upon said shaft, a second clutch unit enclosing said first-named unit and rigidly connected with a gear rotatably mounted upon said shaft, said gear being disposed in close proximity to said frame to thereby serve as an armature for said coil and frame and arranged to be moved in the direction of the latter when the coil is energized for bringing the second-named clutch unit in operative engagement with said first-named clutch unit, and spring-pressed means carried by said first-named clutch unit for moving the second-named clutch unit in an opposite direction when said coil is de-energized.

20. In combination: driving means; driven means; clutch means for operatively connecting said driving and driven means, said clutch means including portions connected with said driving and driven means respectively; means including a magnet and armature for actuating said portions into effective engagement; and means including a spring pressed plunger carried by one of said portions, for moving said portions out of engagement when said actuating means is ineffective.

21. A magnetic clutch comprising a frame having an annular recess in one face, an electric coil disposed within said recess and having one edge terminating relatively near the face in which said recess is provided, a shaft, a clutch spider rigidly secured to said shaft and having a flange on one end, a plurality of spaced-apart rings disposed upon said clutch spider, a clutch pot rotatably disposed upon said shaft and arranged for longitudinal movement thereon, a plurality of spaced-apart rings operatively connected with said clutch pot and disposed alternately between said first named rings, said clutch pot being provided with a plurality of openings, a pressure ring disposed upon said clutch pot and having lugs projecting through said openings for moving the rings into frictional engagement when said clutch pot is moved in the direction of said frame, an adjusting nut disposed upon said clutch pot and arranged for moving said pressure ring, and an armature secured to said clutch pot and disposed relatively near that face of said frame having the recess therein and parallel thereto.

22. In combination: a rotatable shaft; a clutch element rotatable with and movable axially of said shaft; another clutch element normally out of engagement with said first named element; operating means for causing engagement of said clutch elements, disposed at one axial side of said elements; and actuating means, for said operating means, comprising a normally stationary magnet, and an armature rotatable about and movable axially of said shaft, said magnet and said armature being disposed at the other axial side of said elements.

23. In combination: a rotatable shaft; a plurality of friction discs rotatable with said shaft and movable axially thereof; a rotatable member; a plurality of friction discs rotatable with said member and movable axially thereof and alternating with said first named discs; operating means disposed at one axial side of and for causing engagement of said two pluralities of discs; and actuating means for said operating means disposed at the other axial side of said two pluralities of discs.

24. In combination: a rotatable shaft; a plurality of friction discs rotatable with said shaft and movable axially thereof; a rotatable member; a plurality of friction discs rotatable with said member and alternating with said first named discs; operating means disposed at one axial side of and for causing engagement of said two pluralities of discs; actuating means for said operating means disposed at the other axial side of said two pluralities of discs; and means for adjusting the relationship of said two pluralities of discs when said actuating means is ineffective.

25. In combination: a rotatable shaft; an abutment functionally integral with said shaft; a pressure ring surrounding said shaft; a plurality of friction discs movable axially of said shaft and disposed between said abutment and said pressure ring, a portion of said plurality of discs being rotatable with said shaft; a rotatable member movable axially of said shaft for carrying another portion of said friction discs; and means for adjustably connecting said rotatable member with said pressure ring.

26. In combination: a rotatable shaft; an abutment on said shaft; a pressure ring surrounding said shaft; a plurality of friction discs movable axially of said shaft and disposed between said abutment and said pressure ring, a portion of said plurality of discs being rotatable with said shaft; a rotatable member movable axially of said shaft for carrying another portion of said friction discs; means for connecting said rotatable member with said pressure ring; and means for actuating said rotatable member axially in a direction to cause effective engagement of said plurality of discs, said actuating means being disposed on the axial side of said discs opposite from said pressure ring.

27. In combination: a rotatable shaft; an abutment on said shaft; a pressure ring surrounding said shaft; a plurality of friction discs movable axially of said shaft and disposed between said abutment and said pressure ring, a portion of said plurality of discs being rotatable with said shaft; a rotatable member movable axially of said shaft for carrying another portion of said friction discs; means for connecting said rotatable member with said pressure ring; and means for actuating said rotatable member axially in a direction to cause effective engagement of said plurality of discs, said actuating means including a normally stationary magnet and an armature disposed on the axial side of said discs opposite from said pressure ring.

28. In combination: a rotatable shaft; an abutment on said shaft; a pressure ring surrounding said shaft; a plurality of friction discs movable axially of said shaft and disposed between said abutment and said pressure ring, a portion of said plurality of discs being rotatable with said shaft; a rotatable member movable axially of said shaft for carrying another portion of said friction discs; means for adjustably connecting said rotatable member with said pressure ring; and means for actuating said rotatable member axially in a direction to cause effective engagement of said plurality of discs, said actuating means being disposed on the axial side of said discs opposite from said pressure ring.

29. In combination: a rotatable shaft; an abutment functionally integral with said shaft; a plurality of friction discs movable axially of said shaft and disposed for movement toward said abutment; a cylinder surrounding said discs and movable axially thereof; and means adjustable with respect to said cylinder for moving said discs toward said abutment.

30. In combination: driving and driven means, one of said means including a rotatable shaft; clutch means for operatively connecting said driving and driven means, comprising a plurality of friction discs one portion of which is rotatable with said driving means and the other with said driven means; a magnet; an armature for said magnet rotatable about said shaft as a bearing and axially movable on said shaft, and disposed between said clutch means and said magnet; and means for operatively connecting said armature to said clutch means.

31. In combination: a rotatable shaft; clutch mechanism including a portion freely rotatable about and movable axially of said shaft, and another portion rotatable with said shaft; means including a normally stationary magnet for moving said first named portion axially of said shaft into effective engagement with said second named portion; means for biasing said portions out of engagement; and means including a single thrust bearing for said shaft for taking the thrust of said operating means and the reaction of said biasing means.

32. In combination: driving means; driven means; clutch means operatively related to said driving and driven means including a plurality of clutch discs spaced to provide a predetermined amount of play, sets of said plurality of discs being operatively associated with said driving and driven means respectively; means for actuating said sets into driving engagement; means for predetermining the disengaged position of said actuating means; and means carried by said actuating means for adjusting the amount of space between said discs when said actuating means is in disengaged position.

33. In combination: driving means; driven means; clutch means for operatively connecting said driving and driven means; a magnet comprising a normally stationary core, a winding surrounding said core; a disc armature for said magnet, disposed between said magnet and said clutch means; and means whereby movement of said armature toward said magnet causes engagement of said clutch means.

34. In combination: a rotatable shaft; a plurality of friction discs rotatable with said shaft and movable axially thereof; a rotatable member; a plurality of friction discs rotatable with said member and movable axially thereof and alternating with said first named discs; operating means disposed at one axial side of and for causing engagement of said two pluralities of discs; means for fastening said operating means to said rotatable member; actuating means for said operating means disposed at the other axial side of said two pluralities of discs, and means whereby said actuating means is detachably fastened to said rotatable member to permit removal of said actuating means while leaving said two pluralities of discs in assembled condition.

35. In combination: a rotatable shaft; a plurality of friction discs rotatable with said shaft; a housing disposed around said discs; a plurality of friction discs rotatable with said housing and alternating with said first named discs; operating means disposed at one axial side of and for causing engagement of said two pluralities of discs; means for fastening said operating means to said housing; actuating means for said operating means disposed at the other axial side of said two pluralities of discs, and means whereby said actuating means is detachably fastened to said housing to permit removal of said actuating means while leaving said two pluralities of discs in assembled condition.

36. In combination: a rotatable shaft; a clutch element rotatable with and movable axially of said shaft; another clutch element normally out of engagement with said first named element; operating means for causing engagement of said clutch elements, disposed at one axial side of said elements; and actuating means, for said operating means, comprising a normally stationary magnet, having an annular core surrounding said shaft and an annular winding surrounding said core, and an armature rotatable about and movable axially of said shaft, said magnet and said armature being disposed at the other axial side of said elements.

37. In combination: a rotatable shaft; a clutch element rotatable with and movable axially of said shaft; another clutch element normally out of engagement with said first named element; operating means for causing engagement of said clutch elements, disposed at one axial side of said elements; and actuating means, for said operating means, comprising a normally stationary magnet, having an annular winding surrounding said shaft, said winding being iron clad adjacent its inner and outer peripheries and adjacent its axial end furthest from said clutch elements; and an armature rotatable about and movable axially of said shaft, disposed to complete the magnetic circuit of said magnet, said magnet and said armature being disposed at the other axial side of said elements.

38. In combination: driving and driven means; means including clutch elements for operatively connecting said driving and driven means; a cylinder surrounding said clutch elements, said cylinder having a predetermined number of axial openings; a ring surrounding said cylinder and having a predetermined number of projections extending into said cylinder openings, said projections being disposed for causing engagement of said clutch elements; and means for adjusting the position of said ring with respect to said cylinder.

39. In combination: driving and driven means; means including clutch elements for operatively connecting said driving and driven means; a cylinder surrounding said clutch elements, said cylinder having a predetermined number of axial openings; a ring surrounding said cylinder and having a predetermined number of projections extending into said cylinder openings, said projections being disposed for causing engagement of said clutch elements; means for adjusting the position of said ring with respect to said cylinder; and means for maintaining said adjusting means and said ring in fixed relation for a selected adjustment.

40. In combination: driving and driven means; means including clutch elements for operatively connecting said driving and driven means, a cylinder surrounding said clutch elements, said cylinder having a predetermined number of axial openings; a ring surrounding said cylinder and having a predetermined number of projections extending into said cylinder openings, said projections being disposed for causing engagement of said clutch elements; and a threaded nut engaging threads surrounding and on said cylinder, said nut being engageable with said ring.

WILLIAM C. FURNAS.